United States Patent
Cairns et al.

(10) Patent No.: US 10,126,803 B1
(45) Date of Patent: Nov. 13, 2018

(54) CONDITIONAL POWER MANAGEMENT ACTIVITIES

(75) Inventors: Ryan Cairns, Los Altos, CA (US);
Sameer Nanda, San Jose, CA (US);
Benson Leung, Sunnyvale, CA (US);
David James, Mountain View, CA (US)

(73) Assignee: Google LLC, Mountain View, CA (US)

( * ) Notice: Subject to any disclaimer, the term of this patent is extended or adjusted under 35 U.S.C. 154(b) by 1669 days.

(21) Appl. No.: 13/079,538

(22) Filed: Apr. 4, 2011

(51) Int. Cl.
*G06F 1/32* (2006.01)

(52) U.S. Cl.
CPC .............. *G06F 1/32* (2013.01); *G06F 1/3203* (2013.01); *G06F 1/3218* (2013.01)

(58) Field of Classification Search
CPC ......... G09G 2330/021; G09G 2330/02; G09G 2330/023; G09G 3/00; G09G 2300/0413; G09G 2300/0439; G09G 2300/0443; G09G 2300/0447; G09G 2300/0452; G09G 2300/0456; G09G 2300/046; G09G 2300/0465; G09G 2300/0469; G09G 2300/0473; G09G 2300/0478; G09G 2300/0482; G06F 1/3228; G06F 1/3215; G06F 1/3265; Y02D 50/20; Y02D 10/153
USPC .................................................. 345/211, 204
See application file for complete search history.

(56) References Cited

U.S. PATENT DOCUMENTS

| | | | |
|---|---|---|---|
| 5,710,931 A | 1/1998 | Nakamura | |
| 5,768,604 A * | 6/1998 | Yamazaki | G06F 1/3218 713/300 |
| 5,822,599 A * | 10/1998 | Kidder | G06F 1/32 345/212 |
| 5,996,078 A * | 11/1999 | Christensen | G06F 1/3203 713/300 |
| 6,108,028 A * | 8/2000 | Skarbo | G06F 1/3203 348/14.03 |
| 6,246,397 B1 * | 6/2001 | Vossler | G09G 1/167 345/204 |
| 6,384,852 B1 * | 5/2002 | Ye | G06F 1/3231 715/867 |
| 6,404,447 B1 * | 6/2002 | Kitagawa | G09G 5/00 348/E7.083 |
| 6,460,541 B1 * | 10/2002 | Shah | A61F 5/01 128/842 |
| 6,594,767 B1 * | 7/2003 | Wiley | G06F 1/3203 713/300 |
| 6,738,068 B2 | 5/2004 | Cohen et al. | |

(Continued)

OTHER PUBLICATIONS

"Hibernation (computing)", Wikipedia, the free encyclopedia, Feb. 26, 2011, 4 pages.

(Continued)

*Primary Examiner* — Grant Sitta
(74) *Attorney, Agent, or Firm* — Morgan, Lewis & Bockius LLP (57) ABSTRACT

Methods and apparatus for scheduling and controlling power management activities are disclosed. An example method includes detecting, by a computing device, playback of video content at a frame rate that is greater than a predetermined threshold frame rate. The example method further includes, in response to the detection of the playback of video content at the frame rate greater than the threshold frame rate, overriding a screen dimming operation of the computing device.

25 Claims, 6 Drawing Sheets

(56) References Cited

U.S. PATENT DOCUMENTS

| | | | | |
|---|---|---|---|---|
| 6,801,811 | B2* | 10/2004 | Ranganathan | G06F 1/3203 345/211 |
| 7,036,025 | B2* | 4/2006 | Hunter | G09G 3/342 700/12 |
| 7,089,508 | B1* | 8/2006 | Wright | G06F 9/45512 713/300 |
| 7,161,577 | B2 | 1/2007 | Hirakata et al. | |
| 7,614,011 | B2* | 11/2009 | Karidis | G06F 1/3203 345/212 |
| 7,760,210 | B2* | 7/2010 | Plut | G06F 1/3203 345/690 |
| 8,144,638 | B2 | 3/2012 | Lin et al. | |
| 8,281,166 | B2 | 10/2012 | Carroll | |
| 8,478,361 | B2 | 7/2013 | Pratt et al. | |
| 8,624,913 | B2* | 1/2014 | Manabe | G09G 5/003 345/589 |
| 8,635,475 | B2* | 1/2014 | Lin | G06F 1/3215 713/300 |
| 8,872,753 | B2* | 10/2014 | Glen | G09G 3/3406 345/102 |
| 8,881,065 | B2* | 11/2014 | Nickell | G06F 9/542 715/867 |
| 9,715,265 | B1* | 7/2017 | Cairns | G06F 1/3206 |
| 9,892,668 | B2* | 2/2018 | Wadhwa | G09G 3/20 |
| 2002/0047590 | A1* | 4/2002 | Kawano | G09G 5/14 315/169.4 |
| 2002/0047818 | A1 | 4/2002 | Yamamoto et al. | |
| 2002/0154088 | A1 | 10/2002 | Nishimura | |
| 2003/0030618 | A1 | 2/2003 | Jones | |
| 2003/0065497 | A1* | 4/2003 | Rhoads | G06F 1/263 703/18 |
| 2003/0076886 | A1* | 4/2003 | Nagata et al. | 375/240.25 |
| 2004/0150678 | A1* | 8/2004 | Jeong | G09G 5/003 715/867 |
| 2004/0207653 | A1* | 10/2004 | Stavely | G09G 3/22 345/698 |
| 2005/0110746 | A1* | 5/2005 | Hou | 345/156 |
| 2005/0182612 | A1 | 8/2005 | Anderson et al. | |
| 2005/0212737 | A1 | 9/2005 | Yoshihara et al. | |
| 2005/0223245 | A1* | 10/2005 | Green | G06F 1/26 713/300 |
| 2006/0087502 | A1* | 4/2006 | Karidis | G06F 1/3203 345/211 |
| 2006/0101293 | A1* | 5/2006 | Chandley | G06F 1/3203 713/300 |
| 2006/0129703 | A1 | 6/2006 | Oshikawa et al. | |
| 2006/0132474 | A1* | 6/2006 | Lam | G09G 3/20 345/204 |
| 2006/0146056 | A1* | 7/2006 | Wyatt | G09G 5/006 345/501 |
| 2006/0192784 | A1 | 8/2006 | Yamaji et al. | |
| 2006/0227125 | A1 | 10/2006 | Wong et al. | |
| 2006/0239574 | A1 | 10/2006 | Brower et al. | |
| 2006/0250385 | A1* | 11/2006 | Plut | G09G 5/00 345/211 |
| 2006/0267972 | A1* | 11/2006 | Yi | 345/211 |
| 2006/0294475 | A1* | 12/2006 | Holecek | G06F 3/0481 715/781 |
| 2007/0126729 | A1* | 6/2007 | Yoon | G06F 1/3218 345/211 |
| 2007/0222895 | A1* | 9/2007 | Yamauchi | H04N 5/445 348/701 |
| 2007/0257998 | A1* | 11/2007 | Inoue | 348/272 |
| 2007/0279369 | A1 | 12/2007 | Yao et al. | |
| 2008/0042954 | A1 | 2/2008 | Lee et al. | |
| 2008/0065918 | A1 | 3/2008 | Wong et al. | |
| 2008/0143728 | A1* | 6/2008 | Gorla | G09G 5/363 345/501 |
| 2008/0177994 | A1* | 7/2008 | Mayer | G06F 9/4418 713/2 |
| 2008/0297463 | A1* | 12/2008 | Tsuru et al. | 345/102 |
| 2008/0309610 | A1 | 12/2008 | Yoshida et al. | |
| 2009/0070606 | A1 | 3/2009 | Chen et al. | |
| 2009/0121655 | A1 | 5/2009 | Kojima et al. | |
| 2009/0179909 | A1* | 7/2009 | Fernandez | G09G 5/00 345/581 |
| 2009/0219244 | A1 | 9/2009 | Fletcher et al. | |
| 2009/0237384 | A1* | 9/2009 | Hu | 345/211 |
| 2009/0244048 | A1 | 10/2009 | Yamanaka | |
| 2009/0303170 | A1 | 12/2009 | Chung et al. | |
| 2009/0320055 | A1 | 12/2009 | Langille et al. | |
| 2010/0131777 | A1 | 5/2010 | Fard et al. | |
| 2010/0180228 | A1* | 7/2010 | Ben-Harrush | G06F 1/3218 715/803 |
| 2010/0192219 | A1* | 7/2010 | Carvajal | H04N 21/44222 726/19 |
| 2010/0265280 | A1 | 10/2010 | Yen et al. | |
| 2010/0277511 | A1* | 11/2010 | Karaoguz | G09G 3/2096 345/690 |
| 2010/0295774 | A1* | 11/2010 | Hennessey | 345/156 |
| 2011/0025713 | A1 | 2/2011 | McIntyre et al. | |
| 2011/0074752 | A1* | 3/2011 | Kikuchi | 345/207 |
| 2011/0134142 | A1 | 6/2011 | Yamazaki et al. | |
| 2011/0157254 | A1 | 6/2011 | Yamazaki et al. | |
| 2011/0161485 | A1* | 6/2011 | George | H04L 65/4069 709/224 |
| 2011/0161585 | A1* | 6/2011 | Kottapalli | G06F 12/0817 711/122 |
| 2011/0175894 | A1* | 7/2011 | Wakimoto | G09G 3/3648 345/212 |
| 2011/0181611 | A1* | 7/2011 | Zhang | G09G 3/342 345/589 |
| 2011/0187758 | A1 | 8/2011 | Miyake et al. | |
| 2011/0243440 | A1* | 10/2011 | Zhou | G06T 5/009 382/168 |
| 2011/0267381 | A1 | 11/2011 | Yamazaki et al. | |
| 2011/0304657 | A1 | 12/2011 | Yamamura et al. | |
| 2012/0033151 | A1 | 2/2012 | Toyotaka et al. | |
| 2012/0110360 | A1 | 5/2012 | Lin et al. | |
| 2012/0182332 | A1 | 7/2012 | Liu | |
| 2012/0194480 | A1 | 8/2012 | Tateuchi et al. | |
| 2012/0200484 | A1* | 8/2012 | Sankar | G09G 3/3406 345/102 |
| 2012/0218175 | A1 | 8/2012 | Uemura et al. | |
| 2012/0265844 | A1 | 10/2012 | Chen | |
| 2012/0299977 | A1* | 11/2012 | Chen | G09G 3/3406 345/690 |
| 2013/0009857 | A1 | 1/2013 | Tchoukaleysky | |
| 2013/0088479 | A1 | 4/2013 | Kim et al. | |
| 2015/0206480 | A1 | 7/2015 | Foo et al. | |

OTHER PUBLICATIONS

"Sleep Mode", Wikipedia, the free encyclopedia, Feb. 22, 2011, 2 pages.

"Managing Power with Group Policy: Part 2 of 3", Ask the Directory Services Team, Mar. 19, 2008, 2 pages.

Kazadorl, "Windows 7 computer goes into Sleep Mode while there is system activity", retrieved from http://answers.microsoft.com/en-us/windows/forum/windows_7-performance/windows-7-computer-goes-into-sleep-mode-while/bcd680cc-4ae4-4476-82ea-c26d4c88b218, May 8, 2010, 7 pages.

"MAC OS X: Why Your Mac Might Not Sleep or Stay in Sleep Mode", retrieved from http://web.archive.org/web/20090220210605/http://support.appale.com/kb/HT1776, Jun. 11, 2008, 6 pages.

"Screen Saver Taking Longer to Start ? In Windows 7 and Vista", Windows 7 Hacker, Aug. 24, 2009, 5 pages.

* cited by examiner

CONDITIONAL POWER MANAGEMENT ACTIVITIES

TECHNICAL FIELD

This application relates, in general, to control of power management activities in a computing device.

BACKGROUND

Computing devices, such as laptop computers, netbook computers, or other such devices, often implement a number of power management techniques in order to reduce the amount of power consumed by those devices. In some approaches, such techniques may be used only when the device is operating on battery power, or, in other approaches, may be used regardless of the power source being used (e.g., battery or AC power). Common power management techniques include performing a screen dimming operation for a display panel of a computing device, turning off the screen and/or performing a system suspend operation, where current operating information for a computing device is saved to random access memory (RAM) or to disk (e.g., a hard drive or flash drive) and the computing device is then placed in a very low power operating state.

A suspend-to-RAM state in a computing device may be referred to as "Standby," "Sleep," or "Suspend," depending on the particular embodiment In such a low-power state, aside from powering the random access memory ("RAM") that is required to restore a computing device's operating state, the computing device attempts to reduce or cut power to all unneeded parts of the machine (e.g., the hard disk(s) stop spinning, the display device is placed into a dark or low-power state, and peripheral devices are de-powered). Such a low-power state often is called Standby (for computing devices running a Microsoft Windows 95-Server 2003 operating system), or is called Sleep (for computing devices running an Apple operating system or a Windows Vista, Windows 7, Windows Server 2008 operating system), or Suspend (for computing devices running a Linux operating system). In such a state, the processing functions of the computing device are powered down, and some small amount of power is used to preserve the contents of RAM and support waking up the computing device from the low-power state into an active power state. When the computing device is placed into the Standby, Sleep, or Suspend to RAM state, it typically consumes less than about 20% of the total power that is consumed when the computing device 100 is operating in an active power state.

A suspend-to-disk state in a computing device may be referred to as "Hibernate," or "Safe Sleep" or "suspend-to-disk," depending on the particular embodiment. In such a state, the contents of a computing device's RAM are written to non-volatile storage such as a hard disk, as a file or on a separate partition, before powering off the computing device. When the computing device is restarted or resumed from the suspend-to-disk state, it reloads the data that had been written to the non-volatile memory and is, thus, restored to the state it was in when the suspend-to-disk power state was invoked. To enable the suspend-to-disk power state, the hard disk must have sufficient free space to store all non-replaceable contents of RAM. Such a low-power state often is called Hibernate (for computing devices running a Microsoft Windows 95-Server 2003 operating system, a Microsoft Vista operating system or a Microsoft Windows 7 operating system), Safe Sleep (for computing devices running an Apple operating system), or suspend-to-disk (for computing devices running a Linux operating system). When the computing device is placed into the suspend-to-disk power state, it typically consumes about as much power as is consumed when the computing device is powered off.

Such power management techniques may be performed by a computing device when the computing device detects that it has not received any user input (e.g., keyboard or pointing device input) in a specific period of time and has not been explicitly instructed by an interface of an application running on the system to not perform power management activities. For example, a computing device may first dim a computing device's screen after a period of time, and then, sometime later, turn off the screen, and then, sometime even later, perform a system suspend operation, such as those described above.

In certain situations, occurrence of such power management activities may be undesirable and detract from a user's experience when using a given computing device. For instance, if a user is streaming multimedia content, displaying content in a full-screen mode or downloading one or more files using a cloud-based computer or a web browser of a non-cloud based computing device, occurrence of power management actions may detract from the user's experience by disrupting operation of the computing device (e.g., operation of a display screen, an audio system and/or a network interface).

SUMMARY

In a general aspect, a computer-implemented method includes detecting, by a computing device, playback of video content at a frame rate that is greater than a predetermined threshold frame rate; and, in response to the detection of the playback of video content at the frame rate greater than the threshold frame rate, overriding a screen dimming operation of the computing device.

Implementations may include one or more of the following features. For example, the computer-implemented method may include, in response to the detection of the playback of video content at the frame rate greater than the threshold frame rate, rescheduling the screen dimming operation. The threshold frame rate may be one of fifteen frames per second and twenty-two frames per second. The computer-implemented method may include determining that a display area associated with the playback of the video content is greater than a threshold area, where overriding of the screen dimming operation may be further in response to the determination that the display area associated with the playback of the video content is greater than the threshold area.

The computer-implemented may include, in response to the detection of the playback of video content at the frame rate greater than the threshold frame rate and in response to the determination that the display area associated with the playback of the video content is greater than the threshold area, overriding and rescheduling both a screen power-off operation and a system suspend operation in the computing device. The threshold area may be one-quarter of an overall display area size for the computing device. The threshold area may be one-half of an overall display area size for the computing device.

Detecting playback of video content at a frame rate that is greater than a predetermined threshold frame rate may include detecting the playback of the video content in an active display window. Determining that a display area associated with the playback of the video content is greater than a threshold area may include determining that the display area associated with the playback of the video content is in the active display window. Detecting playback of video content at a frame rate that is greater than a predetermined threshold frame rate may include detecting the playback of the video content in an active browser tab. Determining that the display area associated with the playback of the video content is greater than a threshold area may include determining that the display area associated with the playback of the video content is in the active browser tab.

The detection of the playback of video content at the frame rate greater than the threshold frame rate and the determination that the display area associated with the playback of the video content is greater than the threshold may be performed periodically in accordance with a screen-dimming timeout value. The detection of the playback of video content at the frame rate greater than the threshold frame rate and the determination that the display area associated with the playback of the video content is greater than the threshold area may include examining one or more properties of an active display window.

The computer-implemented method may include, in response to the detection of the playback of video content at the frame rate greater than the threshold frame rate, overriding and rescheduling a screen power-off operation and a system suspend operation in the computing device. The screen power-off operation and the system suspend operation may be rescheduled at respective times that are relative to a rescheduled screen dimming operation.

Detection of the playback of video content at the frame rate greater than the threshold frame rate may include monitoring a rate at which a display window of the computing device is modified. Detection of the playback of video content at the frame rate greater than the threshold frame rate may include detecting the playback of the video content in an active display window.

In another general aspect, a computer-implemented method includes detecting, by a computing device, that a full-screen display mode has been activated in the computing device; and, in response to the detection that the full-screen display mode has been activated, overriding and rescheduling a screen dimming operation in the computing device.

Implementations may include one or more of the following features. For example, the computer-implemented method may include, in response to the detection that the full-screen display mode has been activated, overriding and rescheduling both a screen power-off operation and a system suspend operation in the computing device. The screen power-off operation and the system suspend operation may be rescheduled at respective times that are relative to the rescheduled screen dimming operation. Detection that the full-screen display mode has been activated may include detecting that the full-screen display mode has been activated for visual content being actively displayed by the computing device.

In another general aspect, a computer-implemented method includes detecting, by a computing device, playback of audio content at a bit-rate above a threshold bit rate and, in response to the detecting, overriding and rescheduling a suspend operation in the computing device.

Implementations may include one or more of the following features. For example, the threshold bit-rate may be greater than 32 kilobits per second. The detecting may include detecting playback of audio content at the bit-rate above the threshold bit rate and a time duration above a time threshold. The computer-implemented method may include, during playback of the audio content, dimming a screen of the computing device in response to a timeout of a first timer and powering off the screen in response to a timeout of a second timer.

In another general aspect, a computer-implemented method includes detecting, by a computing device, data traffic between the computing device and a server at a data rate above a threshold data rate and, in response to the detection, overriding and rescheduling a suspend operation in the computing device.

Implementations may include one or more of the following features. For example, the detecting may include detecting data traffic between the computing device and the server at the data rate above the threshold data rate and a time duration above a time threshold. The threshold data rate may be 20 kilobits per second. The threshold data rate may be a percentage of available network bandwidth of the computing device.

The computer-implemented method may include, during communication of the data traffic, dimming a screen of the computing device in response to a timeout of a first timer and powering off the screen in response to a timeout of a second timer. The timeout of the second timer may be relative to the timeout of the first timer.

In another general aspect, a computing device includes a window manager configured to detect playback of video content in an active display window of the computing device at a frame rate that is greater than a threshold frame rate and in a display area that is larger than a threshold area and record a time of the detection in a list of properties for the active display window. The computing device also includes a power manager configured to obtain the recorded time from the list of properties; compare a difference of a current time and the recorded time with a threshold value; and, in the event the difference is less than the threshold value, override and reschedule a screen dimming operation for the computing device.

Implementations may include one or more of the following features. For example, the window manager may be configured to manage one or more inactive display windows. The active display window may include an active browser tab. The power manager may be configured to obtain the recorded time in response to timeout of a timer. The power manager may be configured to, in the event the difference is less than the threshold value, override and reschedule a screen power-off operation, and override and reschedule a system suspend operation. The screen power-off operation and the system suspend operation may be rescheduled at respective times that are relative to a time of the rescheduled screen dimming operation.

In another general aspect, a recordable storage medium has recorded and stored thereon instructions that, when executed, cause a computing device to detect playback of video content at a frame rate that is greater than a predetermined threshold frame rate and, in response to the detection of the playback of video content at the frame rate greater than the threshold frame rate, override a screen dimming operation of the computing device.

In another general aspect, a recordable storage medium has recorded and stored thereon instructions that, when executed, cause a computing device to detect that a full-screen display mode has been activated in the computing device and, in response to the detection that the full-screen display mode has been activated, override and reschedule a screen dimming operation in the computing device.

In another general aspect, a recordable storage medium has recorded and stored thereon instructions that, when executed, cause a computing device to detect playback of audio content at a bit-rate above a threshold bit rate and, in response to the detection of the playback of the audio content above the threshold bit-rate, override and reschedule a suspend operation in the computing device.

In another general aspect, a recordable storage medium has recorded and stored thereon instructions that, when executed, cause a computing device to detect data traffic between the computing device and a server at data rate above a threshold rate and, in response to the detection of the data traffic above the threshold rate, override and reschedule a suspend operation in the computing device.

BRIEF DESCRIPTION OF THE DRAWINGS

Like reference symbols in the various drawings indicate like elements.

DETAILED DESCRIPTION

Figure 1:
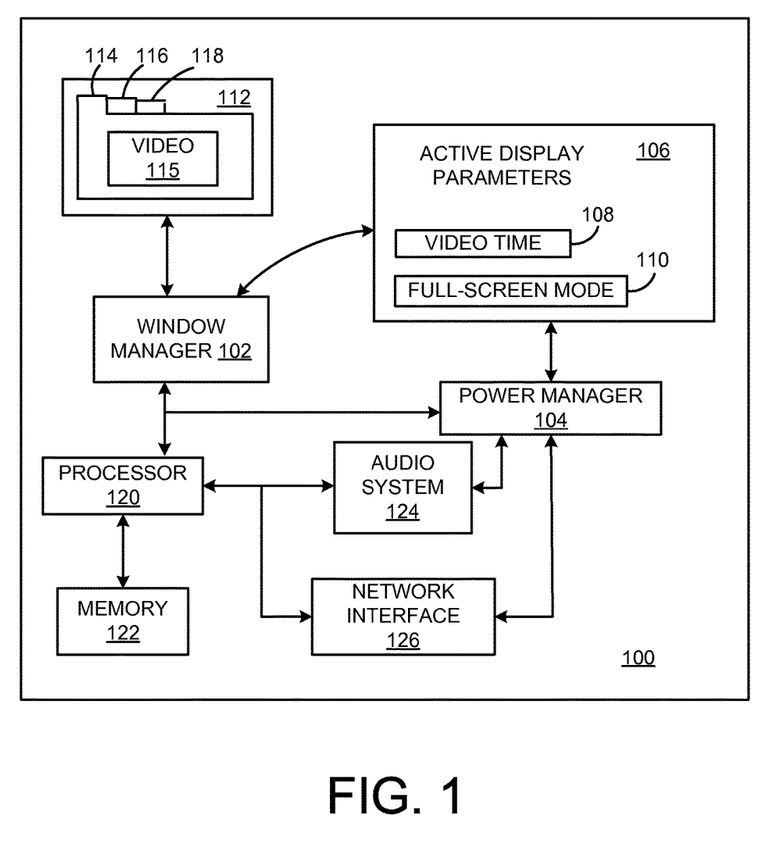
FIG. 1 is a block diagram illustrating a computing device in accordance with an example embodiment.

FIG. 1 is a block diagram illustrating a computing device 100 in accordance with an example embodiment. The computing device 100 may be used to implement the techniques described herein. It will be appreciated, however, that the techniques described herein may also be implemented using a number of other appropriate computing device configurations. For instance, in other embodiments, some elements of the computing device 100 may be eliminated, other elements may be added, or other elements may be used in place of the elements shown in FIG. 1.

The computing device 100 may be used, for example, to implement the methods illustrated in FIGS. 3-6. The various elements of the computing device 100 will be described in general terms with respect to FIG. 1, while further details with respect to the use of those elements with respect to power management operations are provided below with respect to the description of FIGS. 2-7.

The computing device 100 includes a window manager 102, a power manager 104, a list of active display parameters 106, a display screen 112, a processor 120, memory 122, an audio system 124, and a network interface 126. The computing device 100 may be, in some example embodiments, a cloud-based computing device. In some embodiments, the computing device 100 may include a browser application that is used to access content and applications over a network, such as the Internet.

In the computing device 100, the window manager 104 may be configured to manage an active display window for the computing device 100, operate the display screen 112 in a full-screen display mode and manage access to a plurality of display windows 114, 116 and 118. In the example shown in FIG. 1, the display window 114 is the "active" window, while the windows 116 and 118 are "background" windows. In certain embodiments, the techniques described herein, e.g., with respect to FIGS. 3 and 4, may be applied based on content that is currently being displayed in an active window on the display 112, or for content currently being displayed in a full-screen display mode on the display 112.

In other embodiments, the techniques described herein may be applied based on content that is currently being displayed for an active browser tab on the display 112, such as the browser tab 114 shown in FIG. 1. In such approaches, making determinations based on content that is currently being displayed prevents power management actions from being overridden based on content that may be included in inactive windows or inactive browser tabs. For instance, a user may begin streaming a video in a first browser tab and then make the browser tab inactive (not currently displayed), such as the browser tab 116 shown in FIG. 1. In such situations, even while the browser tab 116 remains inactive, the computing system 100 may continue to process information related to video being streamed in the browser tab 116 (e.g., with the processor 120 or a graphics processor). However, using the approaches described herein, the computing device 100 would not override power management activities based on visual content that is associated with an inactive browser tab (e.g., the browser tab 116) or an inactive window.

In the computing device 100, the window manager 102 may be configured to detect playback of video content 115 in the active display window 114 at a frame rate that is greater than a threshold frame rate (e.g., fifteen frames per second). The window manager 102 may be further configured to determine whether the video content 115 is being displayed in a display area that is larger than a threshold area (e.g., one-quarter or one-half the over display area of the screen 112). In some embodiments, the window manager 102 may detect frame rates and make display area determinations using information from a graphics processor, a frame buffer, or another component of the computing device 100 associated with rendering visual content on the display 112 of the computing device 100.

If the window manager 102 determines that the video content 115 is being displayed at a frame rate above the threshold frame rate and in a display area that is larger than the threshold display area, the window manager 102 may be further configured to record a time of that detection and determination as a video time value 108 in a list of properties 106 for the active display window. The power manager 104 may then, based on the video time value 108 indicating that video content exceeding the threshold values is being played back, control (e.g., override and/or reschedule) power management activities, so as not to dim the screen 112, power off the screen 112 or suspend the computing device 100 while a user is watching streaming video (e.g., selected by the user) in the active display window 114. In other embodiments, the active display parameters which may be a list of properties for visual content that is being actively displayed on the display screen 112 in a full-screen display mode, such as described below.

The window manager 102 may also be configured to allow a user of the computing device 100 to select a full-screen display mode for the display screen 112 (as opposed to a windowed mode, where visual content is display with tabs, frames and/or other conventional computer window elements). A user may select the full-screen display mode for displaying a presentation, playing full-screen video, playing a computer game, or for a number of other reasons. If a user selects or activates the full-screen display mode, the window manager 102 may be further configured to write a full-screen mode value 110 to the list of properties 106, so as to indicate that the full-screen display mode has been activated in the computing device 100. The power manager 104 then may, in response to the full-screen mode value 110 indicating that full-screen display mode is active, control (e.g., override and/or reschedule) power management activities, so as not to dim the screen 112, power off the screen 112 or suspend the computing device 100 while a user is actively displaying visual content in the full-screen display mode.

An example embodiment of the power manager 104 is illustrated and described in further detail below. The power manager 104 may work in conjunction with the other elements of the computing device 100 (e.g., the window manager 102, the active display parameters 106, the processor 120, the audio system 124 and/or the network interface 126) to determine whether or not to execute power management operations, whether to override and/or reschedule an entire sequence of power management operations and/or whether to perform some power management operations while overriding other power management operations, such as in the fashions described herein.

The processor 120 may be configured to coordinate the activities of the various components of the computing system 100. For instance, the processor 120 may implement an operating system for the computing device 100 by executing machine readable instructions that are stored in the memory 122. The processor 120 may also implement other operations of the computing device by executing other instructions stored in the memory 122 or included in the other elements of the computing device 100. Further, the processor 120 may operate in conjunction with the power manager 104 to implement power management operations in the computing device 100.

The audio system 124 of the computing device 100 may be used to playback audio content, such as streaming audio. The audio system 124 may also be used to play audio content that is located on the computing device 100, such as system sounds, music files, or other audio content. The network interface 126 of the computing system 100 may be used by the computing device 100 to obtain data from a computing network, such as the Internet, for example. Examples of techniques for controlling power management operations in the computing device 100 are described in further detail below.

Figure 2:
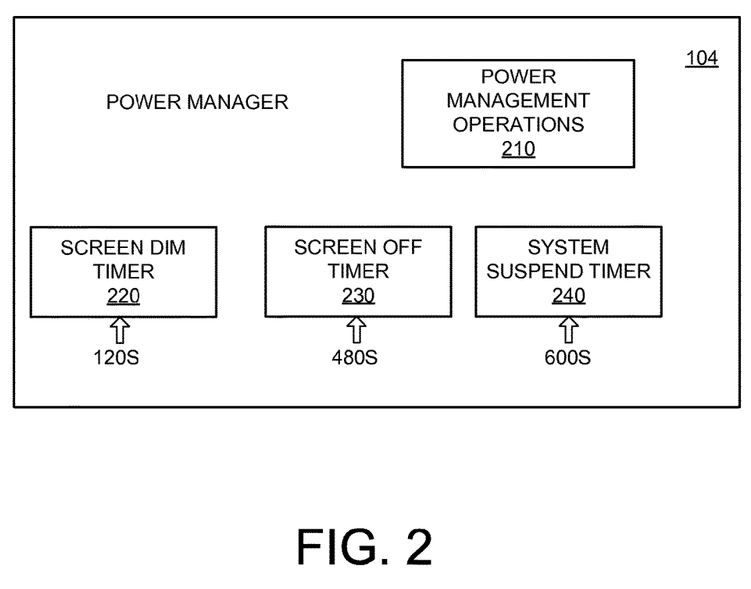
FIG. 2 is a block diagram illustrating a power manager in accordance with an example embodiment, which may be implemented in the computing device illustrated in FIG. 1.

FIG. 2 is a block diagram illustrating a power manager 104 in accordance with an example embodiment. The power manager 104 may be implemented, for example, in the computing device 100 shown in FIG. 1. Of course, the power manager 104 may be implemented in other computing device configurations. Alternatively, the computing device 100 may implement a different power manager, or may implement the functions of the power manager 104 in other fashions.

The power manager 104, as illustrated in FIG. 2 includes a power management operations module 210 that may be used, e.g., in conjunction with other elements of the computing device 100 to implement power management operations in the computing device 100. Depending on the particular embodiment, the power management operations module 210 may include a number of appropriate combinations of hardware, software and/or firmware.

The power manager 104 also includes a screen dim timer 220, a screen power-off timer 230 and a system suspend timer 240. As shown in FIG. 2, these timers 220-240 may operate using respective default time values of 120 seconds, 360 seconds and 600 seconds, though these time values are given by way of example only. The power manager 104 may be configured to perform respective power management operations when each of the timers 220-240 times out. For instance, when the timer 220 times out, the power manager 104 (e.g., using the power management operations module 210) may perform a screen dimming operation. Likewise, when the timer 230 times out, the power manager 104 may perform a screen power-off operation. Further, when the timer 240 times out, the power manager 104 may perform a system suspend operation.

Using the approaches described herein, the power manager 104 may also be configured (along with other elements of the computing device 100) to conditionally perform power management operations based on activities that are being carried out on the computing device 100. For instance, power management operations may be overridden and/or rescheduled by the power manager if it is determined that those power operations may disrupt streaming video playback, streaming audio playback, full-screen display or data communication, as some examples. In the power manager 104, power management operations may be rescheduled by reloading the corresponding timers 220-240 with their default values for the power management operations that are being overridden. Use of default timer values, such as those shown in FIG. 2, results in execution of power management operations and rescheduled of power management operations being relative (in time) to one another. Specific techniques for control of power management operations in, for example, the computing device 100 are now described.

Figure 3:
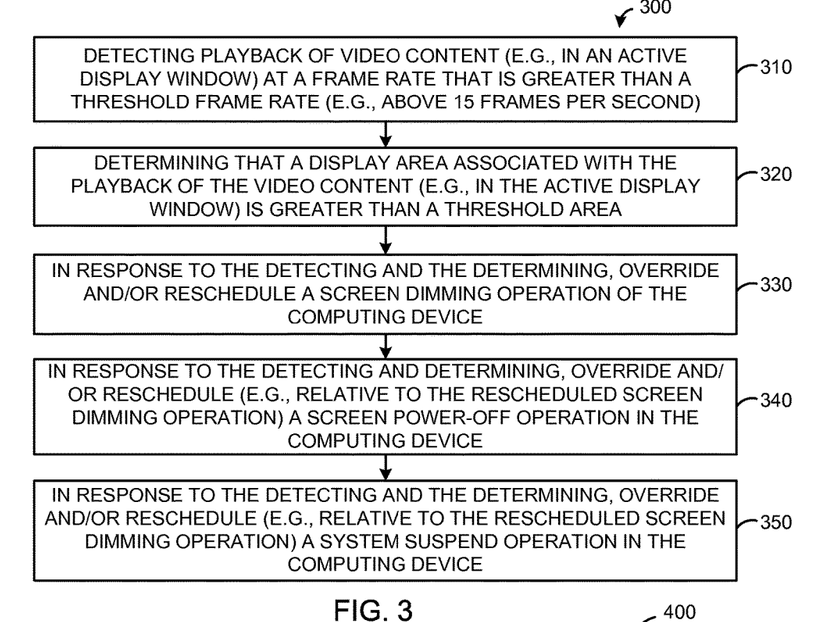
FIG. 3 is a flowchart illustrating a method in accordance with an example embodiment.

FIG. 3 is a flowchart illustrating a method 300 for controlling power management operations in a computing device in accordance with an example embodiment. The method 300 may be implemented, for example, using the computing device 100 shown in FIG. 1 and the power manager 104 shown in FIG. 2. Accordingly, the method 300 will be described with further reference to FIGS. 1 and 2, although the method 300 may be implemented in a number of other appropriate computing device configurations.

As shown in FIG. 3, the method 300 includes, at block 310, detecting playback of video content at a frame rate that is greater than a threshold frame rate. The threshold frame rate may vary depending on the particular embodiment. For instance, in certain embodiments, a threshold frame rate of fifteen frames per second may be used. In other embodiments, a threshold frame rate of twenty-two frames per second may be used. In still other embodiments, other threshold frame rates may be used. In the computing device 100 shown in FIG. 1, the window manager 102 (or another component of the computing device 100) may count a number of frames that are displayed by the computing device 100 (e.g., on the screen 112) over a given time period. The window manager 102 (or other component) may then calculate the frame rate (e.g., a number of frames per second) based on the counted number of frames and the given time period and compare the calculated frame rate with the threshold frame rate. Depending on the particular embodiment, the threshold frame rate used at block 310 may be set such that the threshold frame rate is above a frame rate that is typically used for video advertisements that are delivered, for example, to a browser while a user is navigating the Internet. Such an approach may reduce a number of "false positives" produced at block 310, e.g., where video content that was not streamed at the request of a user of the computing device 100 results in power management activities being inadvertently overridden.

The method 300, at block 310, may include, for example, detecting the playback of the video content 115 in the active window 114 of the display 112 shown in FIG. 1. As previously discussed, the detecting at block 310 may be accomplished jointly by the window manager 102 and the power manager 104. In such an approach, the power manager 104 of the computing device 100 may obtain a video time value 108 (e.g., that is written by the window manager 102) from a list of active display parameters 106. For instance, the power manager 104 may obtain the last written video time value 108 in response to timeout of the screen dim timer 220, shown in FIG. 2. For this particular example, the screen dim timer may time out approximately 120 seconds after the last detected user input or approximately 120 seconds after completion of video playback meeting the thresholds at blocks 310 and 320 is identified by the computing system 100.

At block 320, the method 300 further includes determining that a display area associated with the playback of the video content detected at block 310 is greater than a threshold display area. Using such a display area threshold may further reduce the incidence of false positive identification of video that is being streamed at the request of a user, rather than video that is included, for example, in a browser advertisement. For instance, the operation at block 320 may determine that the playback area of the video content is greater than one-quarter of the total display area, or greater than one-half the total display area, where the threshold is respectively one-quarter or one half the total display area available for the computing device, such as in similar fashion as discussed above with respect to FIG. 1, where the threshold at block 320 is set at a size that is larger than a typical browser advertisement. In certain embodiments, the threshold at block 320 may be defined, for example, by a number of pixels. Of course, these thresholds are given by way of example and a number of other threshold values or types of display area thresholds may be used at block 320.

In such an approach, the window manager 102 may perform the operations of blocks 310 and 320 in conjunction with the power manager 104. For instance, the window manager 102 may analyze visual content that is being displayed by the computing device 100 (e.g., in an active display window or in a full-screen window). If the window manager 102 determines that video content is being played back, where the video playback is above the threshold frame rate and in a playback area that is greater than the threshold area, the window manager 102 may then write a time corresponding with the detection and determination of blocks 310 and 320 as the video time 108 in the active display parameters 106.

The aspects of detecting and determining at blocks 310 and 320 that are performed by the window manager 102 may be accomplished by sub-dividing the total display area of the computing device 100, examining visual content being rendered on the display to determine a rate of change for pixels in the sub-divided areas and then performing, e.g., by the window manager 102, the operations of blocks 310 and 320 based on this information. In an example embodiment, the window manager 102 may be configured to perform the detecting and determining of blocks 310 and 320 on a periodic basis, such as every five seconds, for example.

The detecting and determining of blocks 310 and 320 may be completed by the power manager 104. In this example, the power manager 104 may obtain (e.g., read or request) the video time value 108 from the active display parameters 106, such as when the screen dim timer 220 of the power manager 104 has timed out (e.g., 120 seconds after the last detected user input). The power manager 104 may then compare the video time 108 with the current time (e.g., by subtracting the video time 108 from the current time and comparing the difference with a threshold time value). In this example, if the video time 108 is less than the threshold time value (e.g., five seconds) from the current time, the power manager 104 may conclude that detection of video playback that is above the threshold frame rate and in a display area larger than a threshold area was identified by the window manager 102.

If the computing device 100 is not able to detect and determine that such video playback is occurring, the method 300 may return to block 310 and begin the detection process again. The techniques for detecting and determining the presence of video playback at blocks 310 and 320 are described here by way of example. In other embodiments, other techniques may be employed. For instance, the window manager 102 and the power manager 104 may communicate directly with one another, rather than using the video time value 108.

If the computing device 100 does detect and determine (at blocks 310 and 320) that video playback exceeding the thresholds is occurring, the method 300 also includes, at block 330, in response to the detecting and the determining, overriding and/or rescheduling a screen dimming operation for the computing device 100. For instance, in embodiments using a power manager such as the power manager 104, the screen dim operation may be overridden and a screen dim timer 220 may be reset to its default value (e.g. 120 seconds) and begin counting down again. When the screen dim timer 220 times-out again, the method 300 may once again be implemented by the computing device 100. In other embodiments, the computing device 100 can request confirmation from a user that the user wishes to continue to override power management activities after a predetermined period of time, such as, for example, fifteen minutes or more. Such an approach may allow for conserving power in the event the user walks away from their system while actively rendering video content that meets a frame rate threshold and/or a display size threshold, as described herein.

If the detecting and determining at blocks 310 and 320 do not identify video playback meeting the threshold values, the power manager 104 may then execute the screen dim operation for the computing device (e.g., using the power management operations module 210). Additionally, if the computing device 100, after performing the screen dim operation, does not receive an indication to undim the screen (e.g., as a result of user input, or some other event), the power manager 104 may then turn off the screen when the screen off timer 230 expires, which may occur some fixed time after the screen dim operation. Further, if the computing device 100 does not receive an indication to turn the screen back on after the screen off timer 230 expires, the computing device 100, may proceed to perform a system suspend in response to expiration of the system suspend timer 240. As with the screen dim operation, the screen power-off operation and system suspend may be implemented by the power management operations module 210 of the power manager 104.

In some embodiments, after playback of video exceeding the thresholds at blocks 310 and 320 has completed (e.g., video content exceeding the thresholds at blocks 310 and 320 was previously detected, but is no longer detected), the screen dim timer 220 may be loaded (or reloaded) with a value that is calculated using a default value for the timer 220 and a most recent video time 108. In this situation, the most recent video time 108 may approximate a time when playback of the video content exceeding the thresholds was completed, as it would correspond with the last time the video content was detected, e.g., just prior to completion. If, in this example, the most recent video time 108 occurred N seconds prior to a current time of the computing device 100, the screen dim timer 220 may, in this example, be loaded with its default value (e.g., 120 seconds) minus N seconds (120-N). In such an approach, the screen dim timer 220 may then expire approximately 120 seconds after completion of video playback exceeding the thresholds at blocks 310 and 320. Of course, other defaults values may be used and other methods for reloading the timer 220, as well as timers 230 and 240, may be used.

As discussed above, the timers 220, 230, and 240 may operate relative to one another. For example, if video playback exceeding the threshold values is identified at blocks 310 and 320, the computing device 100 may also override and/or reschedule a screen power-off operation at block 340 and override and/or reschedule a system suspend operation at block 350. While the operations of blocks 330, 340, and 350 are shown sequentially in FIG. 3, it will be appreciated that they may be performed in parallel as part of single operation. For instance, the power management operations may be rescheduled by reloading the timers 220, 230, and 240 with their default values (e.g., 120 seconds, 360 seconds, and 600 seconds, respectively, in one example) in response to the detecting and determining at blocks 310 and 320. In other embodiments, the timers 220, 230 and 240 may be reloaded with values that are based a most recent video time 108 after playback of video content exceeding the thresholds at blocks 310 and 320 has completed. Using the example above, where a most recent video time 108 occurred N seconds prior to a current time of the computing system 100, the timers 220, 230 and 240, in this situation, may be reloaded with their default values minus N (e.g., 120-N seconds, 360-N seconds, and 600-N seconds, respectively).

Figure 4:
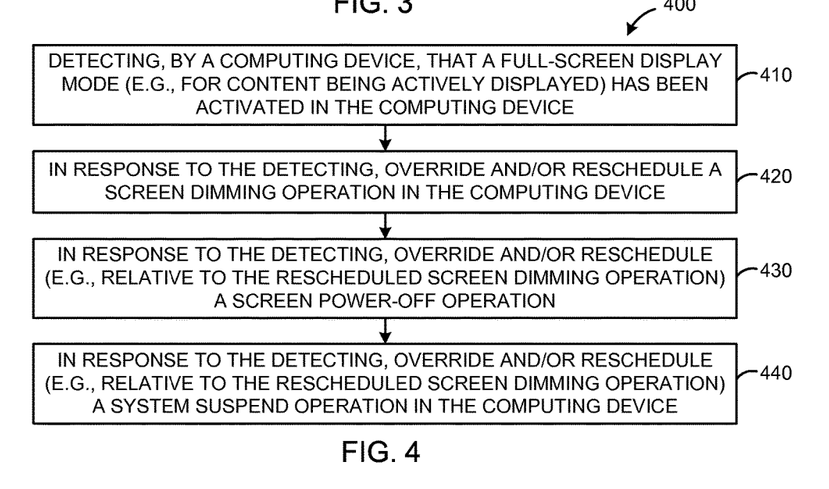
FIG. 4 is a flowchart illustrating a method in accordance with an example embodiment.

FIG. 4 is a flowchart illustrating another method 400 for controlling power management operations in a computing device in accordance with an example embodiment. As with the method 300, the method 400 may be implemented, for example, using the computing device 100 shown in FIG. 1 and the power manager 104 shown in FIG. 2. Accordingly, the method 400 will be described with further reference to FIGS. 1 and 2, although the method 400 may be implemented in a number of other appropriate computing device configurations.

The method 400 includes, at block 410, detecting that a full-screen display mode has been activated in a computing device. For example, the window manager 102 of the computing device 100 may determine that a user has activated a full-screen display mode to display content from an active browser window or that is being rendered by a browser based application, such as to display a full-screen presentation or display video content without window frames, for example. Based on the determination at block 410, the window manager 102 may write a full-screen mode value 110 to the list of active display parameters 106 of the computing device 100. The power manager 104 may then (e.g., when the screen dim timer 220 times-out) obtain the full-screen mode value 110 from the active display parameters to detect whether or not full-screen mode has been activated. In other embodiments, the computing device 100 may determine that a full-screen display mode has been activated using a number of different approaches. For example, the window manager 102 and the power manager 104 may communicate directly with each other, where the power manager requests and/or receives from the window manager the indication of whether or not the full-screen display mode is activated for visual content that is being actively displayed on the display screen 112 of the computing device 100.

If full-screen mode has been activated in the computing device 100 and that activation is detected at block 410, the power manager 104 may override and/or reschedule power management operations (e.g., screen dimming, screen power-off and system suspend) at blocks 420, 430, and 440 in similar fashion as discussed above with respect to blocks 330, 340, and 350. As with the operations of blocks 330, 340, and 350, the operations of blocks 420, 430, and 440 may be performed in parallel, or as a single operation, where all three timers 220, 230, and 240 of the power manager 104 are reloaded with their default values simultaneously. If full-screen display mode is not detected as being active at block 410, the computing device 100 may proceed with its scheduled power management operations (e.g., screen dimming, screen power-off and system suspend) when each of the corresponding timers 220, 230, and 230 times-out.

Figure 5:
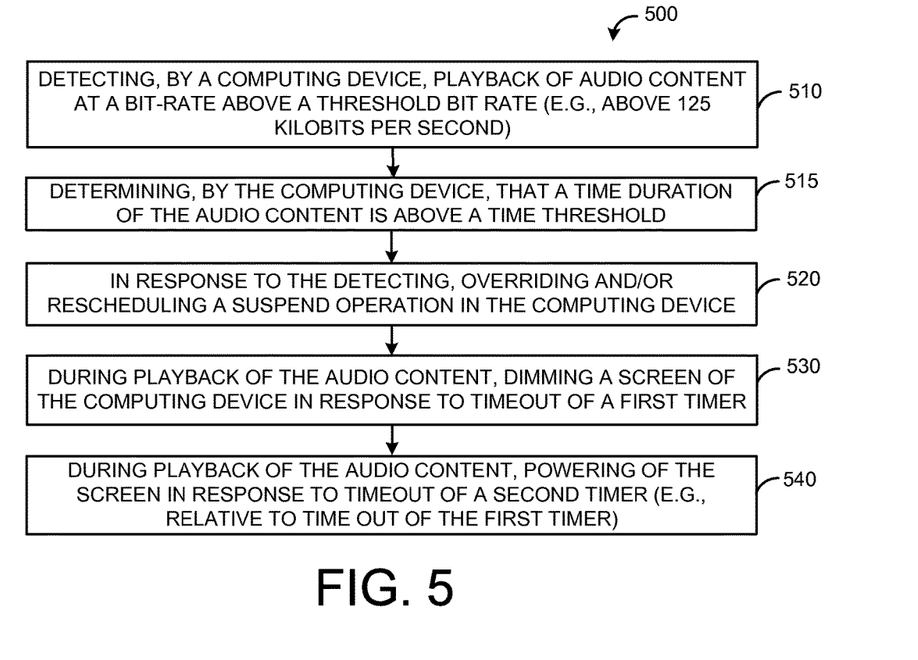
FIG. 5 is a flowchart illustrating a method in accordance with an example embodiment.

FIG. 5 is a flowchart illustrating yet another method 500 for controlling power management operations in a computing device in accordance with an example embodiment. As with the methods 300 and 400, the method 500 may be implemented, for example, using the computing device 100 shown in FIG. 1 and the power manager 104 shown in FIG. 2. Accordingly, the method 500 will be described with further reference to FIGS. 1 and 2, although the method 500 may be implemented in a number of other appropriate computing device configurations.

The method 500 includes, at block 510, detecting playback of audio content at a bit-rate above a threshold bit rate (e.g., 32 kilobits per second), such as audio content being streamed using a browser (e.g., Internet radio). At block 515, the method 500 includes detecting that the audio content being played exceeds a time threshold (e.g., greater than one second or has played for a minimum amount of a given time period, such as five of the last ten seconds). For instance, the power manager 104 of the computing device 100 may monitor an audio system 124 of the computing device 100 to detect the bit-rate and time duration and/or and amount of playback time of such audio content. In similar fashion as the thresholds discussed above with respect to the method 300, the threshold bit rate used at block 510 and the time threshold used at block 515 may help prevent the incidence of false positives that may occur, for example, due to playback of system sounds, or other sounds that use a bit rate below the threshold bit rate and/or that have a time duration less than the time threshold. If such threshold bit rates and/or time thresholds are not used, the power management operations of the computing device 100 could be overridden indefinitely. In some embodiments, the operations of block 510 or the operations of block 515 could be eliminated and only a threshold bit-rate or a time threshold could be used.

In other embodiments, the audio system 124 may write an audio playback value in similar fashion as the video time value 108 and full-screen mode value 110 discussed above. The power manager 104 can then obtain the audio playback value in similar fashion as the video time value 108 and the full-screen mode value 110 to detect playback of audio content above the threshold bit rate at block 510 and/or exceeding the time threshold at block 515.

If playback of audio content above the threshold bit rate is detected at block 510 and/or is of a duration exceeding the time duration threshold at block 515, the power manager 104 may override and/or reschedule one or more power management operations (e.g., system suspend) at block 520 in similar fashion as discussed above (e.g., by reloading the system suspend timer 240 with its default value or its default value minus the time since completion of the audio content playback). In such an arrangement, the power manager 104 may execute, during playback of the audio content, a screen dimming operation at block 530 and a screen power-off operation at block 540, where the timing of the screen dimming operation and the screen power-off operation are performed relative to one another in time, e.g., based on expiration of the timers 220 and 230 using their default values. As power to the display screen 112 of the computing device 100 would not typically be required for playback of audio content, such an approach may reduce power consumption. It will be appreciated that the order of the operations 520-540 may be performed in other orders, as is the case with a number of the method operations described herein.

Figure 6:
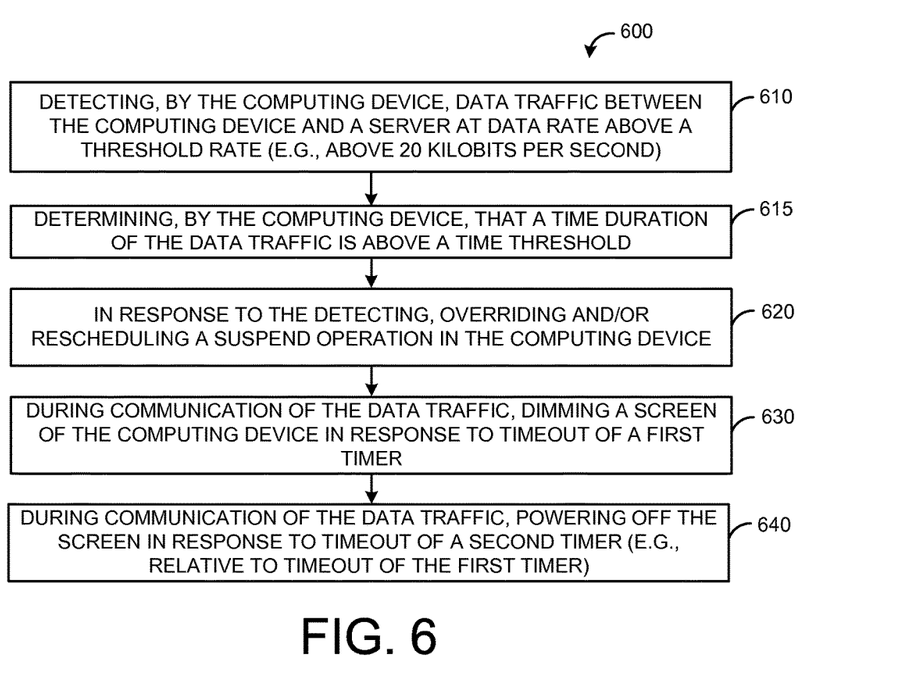
FIG. 6 is a flowchart illustrating a method in accordance with an example embodiment.

FIG. 6 is a flowchart illustrating still yet another method 600 for controlling power management operations in a computing device in accordance with an example embodiment. As with the methods 300, 400, and 500, the method 600 may be implemented, for example, using the computing device 100 shown in FIG. 1 and the power manager 104 shown in FIG. 2. Accordingly, the method 600 will be described with further reference to FIGS. 1 and 2, although the method 600 may be implemented in a number of other appropriate computing device configurations.

The method 600 includes, at block 610, detecting data traffic between the computing device 100 and a server (e.g., over the network interface 126) at a data rate above a threshold data rate, where the threshold data rate is set such that detection of data traffic exceeding the threshold data rate may indicate that a user is downloading data from a network using, for example, a browser interface, as opposed to detection of background network traffic. The threshold data rate may be set at a fixed value, or may be set as a percentage of available bandwidth. For instance, if the computing device 100 has 200 kilobits per second (kbps) of available network bandwidth, the threshold data rate could be set at a percentage of that available bandwidth. For instance, the threshold data rate could be set at ten percent of available bandwidth, which, in this example, would correspond with a threshold data rate of 20 kbps. Of course, the threshold data rate may be set in a number of other appropriate fashions, such as being configurable by a user of the computing device 100.

At block 615, the method 600 may include determining whether a data stream (e.g., a data stream exceeding the threshold data rate at block 610) exceeds a time threshold. The determination at block 615 may be made in similar fashion as the determination made at block 515 of the method 500. In some embodiments, the operations of block 610 or the operations of block 615 could be eliminated and only a threshold data rate or a time threshold could be used.

In such an arrangement, the power manager 104 of the computing device 100 may monitor the network interface 126 of the computing device 100 to detect data traffic and determine whether the data rate of the detected traffic exceeds the threshold data rate at block 610 and/or the time threshold at block 615. In similar fashion as the thresholds discussed above with respect to the methods 300 and 500, the threshold data rate used at block 610 and the time threshold used at block 615 may help prevent the incidence of false positives that may occur, for example, due to low rate data traffic, such as network management data traffic, for example.

In other embodiments, the network interface 126 may write a network activity value in similar fashion as the video time value 108 and full-screen mode value 110 discussed above. The power manager 104 can then obtain the network activity value in similar fashion as the video time value 108 and the full-screen mode value 110 to detect data traffic above the threshold data rate at block 610.

If data traffic above the threshold data rate is detected at block 610 and/or exceeds the time threshold at block 615, the power manager 104 may override and/or reschedule one or more power management operations (e.g., system suspend) at block 620 in similar fashion as discussed above (e.g., by reloading the system suspend timer 240 with its default value or its default value minus a time since completion of the detected data traffic stream). In such an arrangement, the power manager 104 may execute, during communication of the data traffic above the threshold data rate, a screen dimming operation at block 630 and a screen power-off operation at block 640, where the timing of the screen dimming operation and the screen power-off operation are performed relative to one another in time, e.g., based on expiration of the timers 220 and 230 using their default values. As power to the display screen 112 of the computing device 100 would not typically be required for data communication over the network interface 126, such an approach may reduce power consumption. It will be appreciated that the order of the operations 620-640 may be performed in other orders, as is the case with a number of the method operations described herein.

Figure 7:
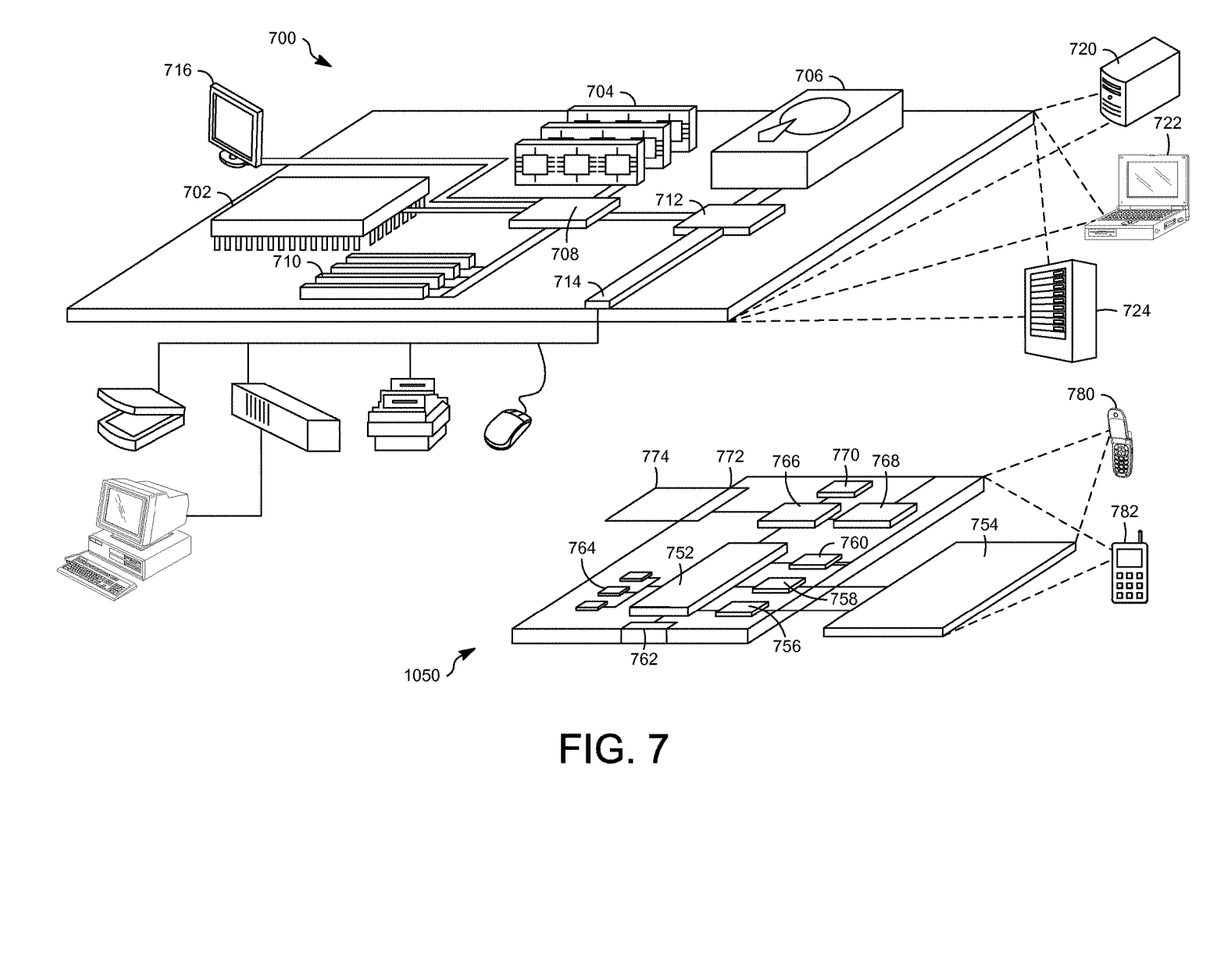
FIG. 7 is a diagram illustrating a computing device and a mobile computing device that can be used to implement the techniques described herein in accordance with an example embodiment.

FIG. 7 is a diagram that shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, which may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   determining, by a computing device, that a screen dim timer has expired; and in response to determining that the screen dim timer has expired:
   detecting, by the computing device, playback of video content in a display area of an active display window of a display screen of the computing device at a frame rate that is greater than a predetermined threshold frame rate;
   recording a time of the detection in a list of properties for the active display window;
   comparing a difference of a current time and the recorded time with a threshold value;
   determining, by the computing device, that a size of the display area of the active display window is greater than a threshold size, the threshold size comprising a predetermined number of pixels; and
   in the event the difference is less than the threshold value and in response to detecting the playback of video content in the display area of the active display window at the frame rate greater than the predetermined threshold frame rate and determining that the size of the display area is greater than the threshold size, overriding execution of a screen dimming operation, the overriding causing the computing device not to dim the display screen of the computing device.

2. The computer-implemented method of claim 1, further comprising, in response to detecting the playback of video content in the display area at the frame rate that is greater than the predetermined threshold frame rate, rescheduling the screen dimming operation.

3. The computer-implemented method of claim 1, further comprising, in response to detecting the playback of video content in the display area at the frame rate greater than the predetermined threshold frame rate, overriding and rescheduling both a screen power-off operation and a system suspend operation in the computing device.

4. The computer-implemented method of claim 1, wherein the threshold size is one-quarter of an overall display screen size of the computing device.

5. The computer-implemented method of claim 1, wherein the threshold size is one-half of the overall display screen size of the computing device.

6. The computer-implemented method of claim 1, wherein detecting playback of video content in a display area of an active display window of a display screen of the computing device at a frame rate that is greater than a predetermined threshold frame rate includes detecting the playback of the video content in an active browser tab.

7. The computer-implemented method of claim 1, wherein the detection of the playback of video content in a display area of an active display window of a display screen of the computing device at the frame rate greater than the predetermined threshold frame rate is performed periodically in accordance with a screen-dimming timeout value associated with the screen dim timer.

8. The computer-implemented method of claim 1, wherein detecting the playback of video content in a display area of an active display window of a display screen of the computing device at the frame rate greater than the predetermined threshold frame rate and determining that the display area is greater than the threshold area comprise examining one or more properties of the active display window.

9. The computer-implemented method of claim 1, further comprising, in response to detecting the playback of video content in the display area at the frame rate greater than the threshold frame rate, overriding and rescheduling a screen power-off operation and a system suspend operation in the computing device.

10. The computer-implemented method of claim 9, wherein the screen power-off operation and the system suspend operation are rescheduled at respective times that are relative to a rescheduled screen dimming operation.

11. The computer-implemented method of claim 1, wherein the predetermined threshold frame rate is fifteen frames per second or twenty-two frames per second.

12. The computer-implemented method of claim 1, wherein detecting the playback of video content in the display area at the frame rate greater than the predetermined threshold frame rate comprises monitoring a rate at which the active display window of the computing device is modified.

13. A computer-implemented method comprising:
 detecting, by a computing device, that a full-screen display mode has been activated in the computing device;
 detecting playback of video content in a display of the computing device at a frame rate that is greater than a predetermined threshold frame rate;
 recording a time of the detection in a list of properties for the display;
 comparing a difference of a current time and the recorded time with a threshold value; and
 in the event the difference is less than the threshold value and in response to the detection that the full-screen display mode has been activated, overriding and rescheduling a screen dimming operation in the computing device.

14. The computer-implemented method of claim 13, further comprising, in response to the detection that the full-screen display mode has been activated, overriding and rescheduling both a screen power-off operation and a system suspend operation in the computing device.

15. The computer-implemented method of claim 14, wherein the screen power-off operation and the system suspend operation are rescheduled at respective times that are relative to the rescheduled screen dimming operation.

16. The computer-implemented method of claim 13, wherein the detection that the full-screen display mode has been activated comprises detecting that the full-screen display mode has been activated for visual content being actively displayed by the computing device.

17. A computing device comprising:
 one or more processors; and
 a memory comprising instructions, which when executed by the one or more processors, cause the computing device to:
 detect playback of video content in an active display window of the computing device at a frame rate that is greater than a threshold frame rate and in a display area that is larger than a threshold area;
 record a time of the detection in a list of properties for the active display window;
 compare a difference of a current time and the recorded time with a threshold value;
 determine that a size of the display area of the active display window is greater than a threshold size, the threshold size comprising a predetermined number of pixels; and
 in the event the difference is less than the threshold value and the size of the display area is greater than the threshold size, override and reschedule a screen dimming operation for the computing device.

18. The computing device of claim 17, wherein the instructions further cause the computing device to manage one or more inactive display windows.

19. The computing device of claim 17, wherein the active display window comprises an active browser tab.

20. The computing device of claim 17, wherein the instructions further cause the computing device to obtain the recorded time in response to timeout of a timer.

21. The computing device of claim 17, wherein the instructions further cause the computing device to, in the event the difference is less than the threshold value:
 override and reschedule a screen power-off operation; and
 override and reschedule a system suspend operation,
 wherein the screen power-off operation and the system suspend operation are rescheduled at respective times that are relative to a time of the rescheduled screen dimming operation.

22. A non-transitory computer-readable storage medium having recorded and stored thereon instructions that, when executed by a computing device, cause the computing device to:
 determine that a screen dim timer has expired; and
 in response to determining that the screen dim timer has expired:
 detect playback of video content in a display area of an active display window of a display screen of the computing device at a frame rate that is greater than a predetermined threshold frame rate;
 record a time of the detection in a list of properties for the active display window;
 compare a difference of a current time and the recorded time with a threshold value;
 determine, by the computing device, that a size of the display area of the active display window is greater than a threshold size, the threshold size being a predetermined fraction of a size of the display screen; and
 in the event the difference is less than the threshold value and in response to detecting the playback of video content in the display area of the active display window at the frame rate greater than the predetermined threshold frame rate and determining that the size of the display area of the active display window is greater than the threshold size, override execution of a screen dimming operation, the overriding causing the computing device not to dim the display screen of the computing device.

23. A non-transitory recordable storage medium having recorded and stored thereon instructions that, when executed by a computing device, cause the computing device to:
 detect that a full-screen display mode has been activated in the computing device;

detect that playback of video content in a display of the computing device is at a frame rate that is greater than a predetermined threshold frame rate;

record a time of the detection in a list of properties for the display;

compare a difference of a current time and the recorded time with a threshold value; and in the event the difference is less than the threshold value and in response to the detection that the full-screen display mode has been activated, override and reschedule a screen dimming operation in the computing device.

24. The method of claim 6, wherein determining that the display area of the active display window of the display screen of the computing device is greater than a threshold area includes determining that the display area is in the active browser tab.

25. The method of claim 7, wherein the determination that the display area associated with the playback of the video content is greater than the threshold area is performed periodically in accordance with a screen-dimming timeout value associated with the screen dim timer.

* * * * *